May 23, 1933.   E. PICK   1,910,361
CHART RECORDING METER
Filed Aug. 8, 1930
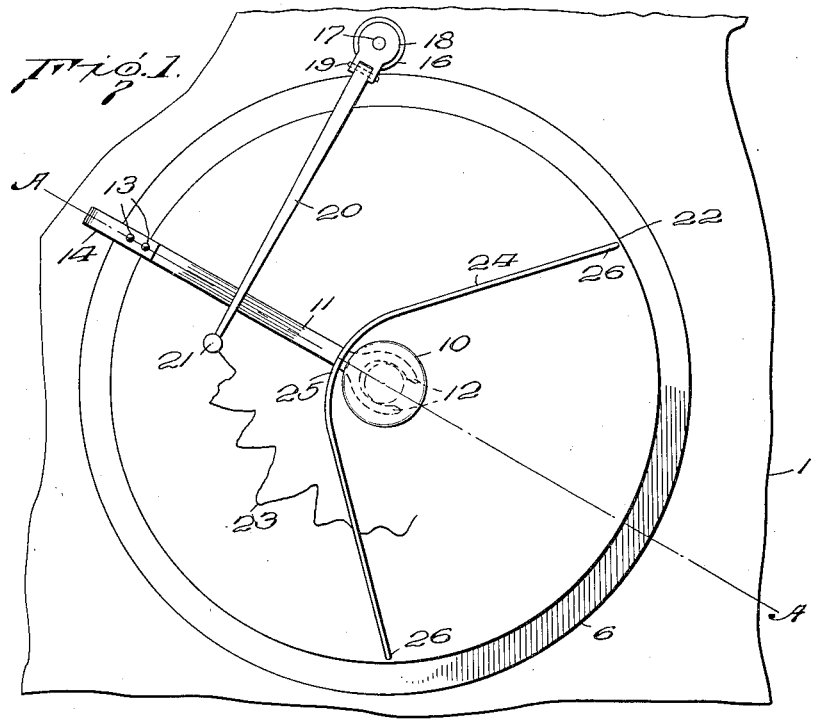
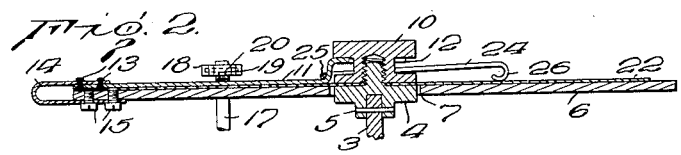
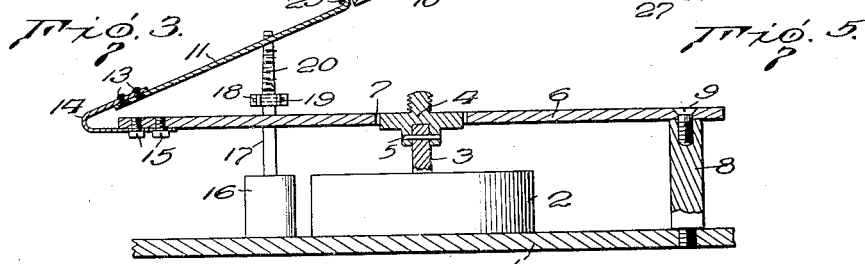
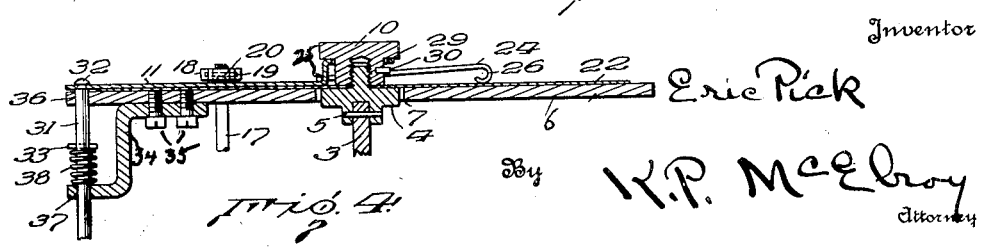
Inventor
Eric Pick
By W. P. McElroy
Attorney Patented May 23, 1933

1,910,361

UNITED STATES PATENT OFFICE

ERIC PICK, OF NEW YORK, N. Y., ASSIGNOR TO THE PERMUTIT COMPANY, OF NEW YORK, N. Y., A CORPORATION OF DELAWARE

CHART RECORDING METER

Application filed August 8, 1930. Serial No. 474,008.

This invention relates to improvements in chart recording meters; and it comprises a recording instrument having the usual chart, chart holding and moving member, chart support and writing member with means near the center of the chart for fastening the chart to the chart moving member and also having an arm for lifting the writing member from the chart, said arm being attached at one end to the instrument near the outer casing, extending over the chart to the chart holding member and yieldably attached to the chart fastener, the lifting arm being normally held inoperative by the chart fastener and being adapted to become operative upon detachment of the chart fastener, said lifting arm being provided with finger extensions and having the triple function of pressing the chart lightly against the support and of both lifting the writing member and holding the chart fastener during chart renewal; all as more fully hereinafter set forth and as claimed.

In a recording meter having the usual moving chart with a writing point connected to mechanism moving in response to a variable factor to be measured such as temperature, pressure, gas composition, electric forces, etc., it is desirable to have means for lifting the writing point from the chart when the latter is to be replaced in order to avoid chart defacement and to facilitate chart removal and chart insertion. Various pen lifting mechanisms are in use and they leave much to be yet accomplished in facilitating chart removal and insertion.

In the present invention I provide new and improved means for lifting the pen or other writing point and in the means for doing this I provide means for holding the chart near its support, the said improved means being yieldably attached to a chart fastener in such a way that when the fastener is detached the pen lifter becomes operative and the means for holding the chart against its support becomes inoperative. Said improved means acts to guide the chart fastener to the correct location in being replaced and facilitates the operation of chart replacement. So doing, I simplify chart replacement and at the same time improve the setting of the chart on its support and the recording effected by the writing point.

The invention is hereinafter described with reference to the accompanying illustrative drawing. In the drawing, Fig. 1 is a view in front elevation of a circular chart recording meter;

Fig. 2 is a view partly in side elevation and partly in transverse section along the line A—A of Fig. 1, the chart being in place;

Fig. 3 is a view similar to that of Fig. 2, with the chart removed.

Fig. 4 shows a transverse section similar to that of Fig. 2, but with an alternative form of spring attachment; and Fig. 5 shows a detail of a frictional hinge which may replace the spring attachment of Figs. 1, 2 and 3.

Referring to the figures, the casing 1 of the instrument contains a clock movement 2 fastened to it. The chart supporting plate 6 is likewise attached to the casing 1 by means of posts 8 and countersunk screws 9. The chart holder 4 is attached to the clock spindle 3 by means of a pin 5 and projects into a circular opening 7 of the chart plate 6. The chart 22 has a central circular hole of such size that it can be inserted easily but without appreciable play over the threaded projection of the chart holder 4. The chart is clamped between the chart holder 4 and the screwed-on chart fastening nut 10, and since the face of the chart holder 4 projects very slightly beyond the face of the chart plate 6, the chart 22 will revolve with the clock spindle 3 thereby sliding over the face of the chart plate 6.

The pen lifting arm 11 has one end in the shape of a fork with two raised prongs 12 the ends of which are slightly closed in so that the chart fastener 10, once forcibly inserted in the fork will be secured loosely but firmly by the two prongs 12. The other end of arm 11 is attached to the spring 14 by means of two rivets 13, and the spring 14 in turn is attached to the chart plate 6 by means of two screws 15. The spring 14 is shaped as shown in Fig. 3. When the chart fastener 10 is screwed on the chart holder 4 the spring 14 is forced to assume the shape shown in Fig. 2. A chart pressing extension 24 is soldered or brazed to the arm 11 at 25. The fingers 26 of extension 24 are bent towards the chart plate 6.

A metering element 16 imparts a limited turning motion to its shaft 17 in response to changes of the variable to be measured which may be pressure, temperature, rate of flow, gas analysis, etc. The shaft 17 carries a hinge 18 to which an arm 20 is connected by a pin 19. This hinge permits the arm 20 with the writing point 21 to swing towards or away from the chart 22, but prevents any sidewise movement except that dictated by the metering element 16. The distance of the recording mark 23 from the center of the chart 22 represents the variable to be measured while the central angle represents the time. The writing point 21 may be a pen point, a metallic point or a pencil lead.

In operation, the arm 11, extensions 24 and fingers 26 act to press the chart upon its support and in changing charts, upon unscrewing the chart fastener 10, it is held by prongs 12 while the spring 14 lifts the arm 11 and with it the arm 20 with the writing point 21 to the position shown in Fig. 3. The chart 22 may now be replaced. Thereupon the chart fastener is again screwed on the chart holder 4 whereby the arm 11 and the two fingers 26 of extension 24 cause the chart 22 to lie flat against the chart plate 6. Simultaneously the arm 20 is released and the writing point 21 comes to rest on the chart 22 on account of its gravity aided by that of the arm 20, and begins to write the record. Arm 11 has the function of guiding the chart fastener 10 to the chart holder 4 and thereby facilitates the operation of chart replacement.

As shown in Fig. 5 the spring 14 may be replaced by a hinge formed by the end of arm 11, the projection 27 of the chart plate 6 and a pin 28. This hinge is assembled with sufficient friction to hold the arm 11 away from the chart plate 6 when it is placed in such position after unscrewing the chart fastener 10.

As can be seen in Fig. 3, the arm 20 may slide down on arm 11 towards the periphery of chart plate 6 in case the metering element 16 is not sufficiently powerful to counteract this tendency. If such sliding takes place it may cause the writing point 21 to be placed on the chart 22 at a location near its periphery, and the beginning of the written record will be a line from the periphery towards the correct value.

This line may be useful in some cases because it clearly marks the beginning of the written record. However, when this mark is not desired the device may be modified as shown in Fig. 4 in which modification the arm 11 in being lifted, remains parallel to the chart plate 6.

In Fig. 4 one end of arm 11 has a round hole 29 in which the chart fastener 10 is inserted and held in place by the pin 30. The shaft 31 is riveted to the other end of arm 11 at 32. The bracket 34 is attached to the chart plate 6 by means of two screws 35. The shaft 31 has a square cross section so that it may move axially through the square opening 36 in chart plate 6 and the opening 37 in bracket 34 without being able to turn. Of course, the same result may be accomplished by any other shape of the cross section of shaft 31 except a circular one, or by means of a key and key way. The coil spring 38 is inserted between the bracket 34 and the pin 33 placed in a hole through the shaft 31. This spring 38 is shown in a compressed condition. Upon unscrewing the chart fastener 10 the spring 38 will expand, thereby lifting shaft 31 with the arm 11. The arm 11, however, in being lifted remains parallel to the chart plate 6 so that the arm 20 has no tendency of sliding towards the periphery of the chart plate 6.

With charts of a large diameter it may be desirable to provide additional points of support along the circumference by using several extensions similar to the extension 24 but shaped so as to space their respective finger ends in the desired manner. Furthermore, the arm 11 and the extensions 24 may be made of one piece so as to avoid the soldered or brazed joint at 25.

The fork shaped opening in the arm 11 may be replaced by a round hole and the paper fastener held in place in this hole by a pin or screw as shown at 30 in Fig. 4. When the chart fastening nut 10 is unscrewed and the lifting arm 11 released, the nut is held either by the prongs 12 or in the hole 29 as the case may be.

What I claim is:

1. In a recording instrument having a stationary chart support, a detachable chart fastener, a writing member and a movable chart holder near the center of the chart support, means for holding and guiding the chart fastener when detached which comprises an arm attached to the chart support near its edge and extending over the chart to the chart fastener, said arm being adapted to hold the writing member away from the chart support during chart replacement.

2. In a chart recording instrument comprising chart-rotating means, a chart support, a hinged writing arm, and a detachable chart fastener, the improvement which comprises an arm extending under the writing arm over the face of the chart and secured by the chart fastener when attached and means attaching the arm to the instrument and allowing movement of the arm in a plane at an angle to the plane of the chart, the arm being adapted to permit free rotation of the fastener when attached and to carry the chart fastener when detached, the arm simultaneously carrying the fastener free of the chart when the arm is moved and lifting the writing arm clear of the chart, said arm also guiding the chart fastener in replacement.

3. In a chart recording instrument comprising chart-rotating means, a chart support, a hinged writing arm, and a detachable chart fastener, the improvement which comprises an arm extending under the writing arm over the face of the chart and secured by the chart fastener when attached and means attaching the arm to the instrument and allowing movement of the arm in a plane at an angle to the plane of the chart, the arm carrying the chart fastener when detached and permitting free rotation of the fastener when attached, the arm being adapted to carry the fastener free of the chart when the arm is moved and simultaneously to lift the writing arm clear of the chart and also to guide the chart fastener in replacement; the arm being provided with spring means adapted to press the rotating chart lightly against the chart support when the fastener is attached to the rotating means.

4. In a chart recording instrument comprising chart-rotating means, a chart support, a hinged writing arm, and a detachable chart fastener, the improvement which comprises an arm secured by the chart fastener when attached and extending over the face of the chart and under the writing arm, the arm being adapted to raise the writing arm away from the chart support during chart replacement and to carry the chart fastener when detached and to guide it in replacement and means permanently connecting the arm to the instrument and causing motion of the arm away from the chart support while keeping the arm parallel thereto, said means automatically coming into play upon detachment of the chart fastener.

5. In a chart recording instrument comprising chart-rotating means, a chart support, a hinged writing arm, and a detachable chart fastener, the improvement which comprises an arm secured by the chart fastener when attached and extending over the face of the chart and under the writing arm, spring means attaching the arm to the chart support, the arm carrying the chart fastener when detached and permitting free rotation thereof when attached, the arm being adapted by said spring means to swing the chart fastener and the writing arm clear of the chart support automatically upon detachment of the chart fastener from the chart rotating means.

In testimony whereof, I have hereunto affixed my signature.

ERIC PICK.